United States Patent [19]
Schlegel

[11] 4,438,936
[45] Mar. 27, 1984

[54] SECONDARY SEALING ELEMENT WITH U-SHAPED SEALING RING FOR MECHANICAL SEALS

[76] Inventor: Rainer Schlegel, Albanstrasse 18, 6234 Hattersheim am Main, Fed. Rep. of Germany

[21] Appl. No.: 235,941

[22] Filed: Feb. 19, 1981

[30] Foreign Application Priority Data

Feb. 29, 1980 [DE] Fed. Rep. of Germany ....... 3007665

[51] Int. Cl.³ .............................................. F16J 15/38
[52] U.S. Cl. .................................. 277/212 C; 277/85; 277/65
[58] Field of Search ........... 277/212 R, 212 F, 212 C, 277/212 FB, 81 R, 85, 25, 65

[56] References Cited

U.S. PATENT DOCUMENTS

| | | | |
|---|---|---|---|
| 2,729,478 | 1/1956 | Chambers et al. | 277/85 X |
| 2,922,668 | 1/1960 | Haake . | |
| 3,117,794 | 1/1964 | Wachal . | |
| 3,897,957 | 8/1975 | Warner | 277/85 |
| 3,907,309 | 9/1975 | Griffiths . | |
| 4,157,187 | 6/1979 | Kemp . | |
| 4,361,335 | 11/1982 | Vinciguerra | 277/204 |

FOREIGN PATENT DOCUMENTS

| | | |
|---|---|---|
| 1204475 | 5/1966 | Fed. Rep. of Germany . |
| 1775727 | 9/1971 | Fed. Rep. of Germany . |
| 2158534 | 10/1972 | Fed. Rep. of Germany . |
| 2755502 | 6/1979 | Fed. Rep. of Germany . |
| 874472 | 5/1942 | France ................................. 277/85 |
| 1131832 | 10/1955 | France . |
| 265615 | 9/1950 | Switzerland . |
| 471338 | 5/1969 | Switzerland . |
| 503149 | 4/1939 | United Kingdom .................. 277/85 |
| 896176 | 5/1962 | United Kingdom . |
| 904256 | 8/1962 | United Kingdom .................. 277/85 |
| 1188859 | 4/1970 | United Kingdom .................. 277/85 |

*Primary Examiner*—Robert S. Ward, Jr.
*Attorney, Agent, or Firm*—Staas & Halsey

[57] ABSTRACT

A secondary sealing element for axial seal rings, is resistant to stresses due to temperature, pressure, vibration, corrosion, swelling and shrinking. This sealing element is produced of non-rubber-type elastic and non brittle material and its shape, in cross-section, consists of a ring, with a pair of arms to give it an elastic reaction. The double-arm ring forms three radial-type sealing surfaces and is completely locked into a chamber. Special material with low static friction and higher thermal conductivity than rubber material is used. Furthermore the dissipation of heat, produced by the axial sliding rings, will be increased through the double contact area to the shaft by the arms in comparison to an O-ring, and through a wear-resistant and non-corrosive layer on the shaft having at least the thermal conductivity of the basic material.

20 Claims, 7 Drawing Figures

SECONDARY SEALING ELEMENT WITH U-SHAPED SEALING RING FOR MECHANICAL SEALS

BACKGROUND OF THE INVENTION

1. Field of the Invention

Axial seal rings serve the purpose of sealing shaft openings of machines. A force acting axially presses a rotating seal ring against a stationary seal ring. The rotating seal ring has a certain axial and radial clearance and is sealed onto the shaft by means of a secondary sealing element, and which is in most cases an O-ring, a lip-type packing or conical ring. This sealing element is subjected to differing stresses due to temperature, pressure, vibration, corrosion, swelling and shrinking, depending on the operation conditions of the machine.

2. Description of the Prior Art

The secondary sealing element is made predominantly of a rubber-type elastic material whose high elasticity has the advantage of better compensating for any roughness of the sealing surfaces, and, in particular of elastically absorbing machine vibrations. This guarantees a plane-parallel run of the seal faces of the rotating and the stationary seal ring. The seal rings used in pumps and agitators in the chemical and pharmaceutical industry frequently have to work with secondary sealing element materials possessing the necessary chemical stability, e.g. polytetrafluoroethylene, hereafter referred to as PTFE, at the cost of insufficient elasticity. These secondary sealing elements are frequently designed in the form of conical rings. Seal rings of this kind show a higher leakage than those with rubber-type elastic secondary seals. Moreover, by using conical rings, the axial mobility of the rotating seal ring on the shaft is impeded due to the large frictional surface. It is common practice to produce PTFE-O-rings and lip-type packings based on PTFE or O-rings with an elastic core and a PTFE covering.

The service-life of these sealing elements is limited predominantly by the operating temperature and the shaft vibrations in addition to the chemical reactions. Axial seal rings cause the development of heat at the sliding surface, which puts a stress on the secondary seal ring element. The amount of heat generated depends on the sliding properties of the materials used and the lubricating quality of the medium to be sealed, provided that the surface quality of both the rotating and the stationary seal rings is equal. In the chemical industry rotating and stationary seal rings are frequently produced in ceramic material, synthetic coal or graphite. In recent years, the development towards highly wear-resistant materials, like cemented tungsten carbide, or silicon carbide has continued. On coupling these materials, a higher friction coefficient than on coupling ceramics and coal is permitted. Utilizing highly wear-resistant materials by coupling tungsten carbide with tungsten carbide or tungsten carbide with silicon carbide in almost all cases results in a higher thermal load of the secondary sealing element of the seal ring. This leads to a more frequent failure of the seal ring owing to destruction or deformation of the secondary sealing element.

On the other hand, the secondary sealing element of the axial seal ring having a high sensitivity to dirt is incorporated into the seal, whereas by use of PTFE dirt produces grinding traces on the sealing element leading to channels which give rise to leakage. The disadvantages of the rubber-type elastic materials are the limited thermal and chemical stabilities. The disadvantage of being susceptible to dirt particles is true for all materials presenting no wear-resistance. Sealing elements made of PTFE possess high chemical and thermal stability. In continuous operation PTFE can be used up to about 200° C. Its elasticity is very low. On the other hand, the material has undesired flow properties which will be raised under the influence of increasing temperature and pressure. To counteract this influence the PTFE seal is largely enclosed and furthermore the PTFE material is mixed with glass, graphite, carbon, ceramic or metallic materials. But the secondary sealing element cannot be enclosed totally. The rotating axial seal ring must have some small clearance on the shaft. This gap between the axial seal ring and the shaft is sufficient for the expansion of PTFE due to shaft vibrations. Secondary sealing elements with PTFE covering formed as O-rings possessing an elastomer core often fail, because the chemicals penetrate into the sealing element due to diffusion and in this way the elastic support is destroyed. Therefore secondary sealing elements of PTFE are also produced with a conical cross section. In that case a special design of the rotating axial seal ring for holding the key is necessary. But tapered secondary sealing elements impede the axial clearance and totally prevent the radial clearance of the axial seal ring. Another secondary sealing element, according to West German Offenlegungsschrift No. 27 55502 and U.S. Pat. No. 4,157,187 consists of an O-ring made of a metallic or rubber-type elastic core covered with graphite. This sealing element suffers from the disadvantages of the graphite being unstable with regard to heavily oxidizing agents, the instability of the elastomeric core and the inelastic behaviour of the graphite coating, which can be easily broken due to pressure and vibration loads. The axial seal ring must be given a special shape like for the tapered secondary sealing element, in order to provide readjustment of the seal.

As disclosed in U.S. Pat. No. 3,117,794, another flexible sealing ring is formed as a V and is positioned between a locating ring and a sealing member. The sealing member is positioned in such a manner to make axial and radial movements caused by the rotating shaft. The stress and the inside pressure of the machine effects the V-sealing ring. The sealing ring gets into the free space between the locating ring and a sliding ring and then it becomes fixed by both rings. Rubber elastically and use of a low elastic material also lead to a rapid deterioration of the sealing ring.

In French Pat. No. 1,131,832, a secondary sealing element is described which has two conical shoulders biased by spring force, is positioned between a driving device and an axial seal ring, and is adjusted under strength on the shaft. To diminish the static friction on the shaft, the sealing element is scratched out of the contact area with the shaft, to reduce the static friction. This sealing element seals radial to the shaft and axial to the conical shoulders of the axial seal ring. Between the driving device and axial seal ring there remains a space. In practice, the axial seal ring moves axially and radially. These movements are not done by the conical sealing face. This results in a clearance between the sealing face of the axial seal ring and the conical shoulders of the secondary sealing element and leads to leakage.

In German Offenlegungsschrift No. 1,775,727, a self-sealing mechanical seal is proposed which avoids a secondary sealing element. Further, there is arranged a springy ring body formed as a V or U and housing mounted on its free ends sliding rings, which are sealed axially to the shaft shoulder and to the casing. This springy ring body is stressed by torsion from the rotating shaft. This leads frequently to stress corrosion on the springy ring body, especially when stainless steel is used.

In U.S. Pat. No. 3,907,309 and German Patentschrift 1,204,575, there are also proposed self-sealing mechanical seals. These seals are constructed by a double sliding ring in both axial directions and their sliding surface is connected elastically. The disadvantage is their failure by stress corrosion, similar to the seal design of German Offenlegungsschrift No. 1,775,727. Further, these types of seal constructions do not guarantee adjustment of the sliding faces when vibrations of the shaft occur, especially by pumps to seal liquids and gases.

O-ring seals made of perfluoro-elastomers demonstrated permanent deformation in practical use owing to a fluid medium temperature of 140° C. and the simultaneous influence of chemicals giving rise to a premature seal ring failure. Occasionally, the perfluoro-elastomer ring is radially split due to the material structure. The main disadvantage of the material is its expensive production technology. The manufacturing expenses for radial PTFE sealing elements amounts to only 1/10 to 1/20 compared to the perfluoro-elastomer gaskets.

On using mechanical seals it has been proven helpful to coat the shaft itself or the shaft tube protector by the help of a wear-resistant and non-corrosive coating is necessary because gaps represent preferred regions of corrosion attack. Hence ceramics or other metal oxides like alumina or chromic oxide will be applied. But these oxide-type materials have a worse thermal conductivity than the basic materials of the shafts or the shaft tube protectors. This is the reason for a heat storage at the secondary sealing element.

SUMMARY OF THE INVENTION

The object of the present invention is therefore to provide a secondary sealing element for axial seal rings having the necessary elasticity and chemical stability. Furthermore it has to show low susceptiblity to pressure, contamination and high temperature. The sealing element should enable slight axial and radial clearance of the axial seal ring in order to elastically absorb vibrations and compressive impact loads of the machine shaft. The subject of this invention is a secondary sealing device for an axial seal ring assembly having a chamber therein with a cylindrical surface wall surrounding the axial shaft, the secondary sealing device comprising:

(a) a biased axial sliding and adjustment ring positioned in the chamber; and (b) a sealing ring positioned around the shaft in the chamber between the cylindrical surface wall and the sliding and adjustment ring, formed of a material with good sliding low-elasticity, and non-brittle characteristics, having a generally U-shaped cross-section with two arms arranged symmetrically or unsymmetrically to a plane perpendicular to the axis of rotation of the shaft, and pressed into sealing engagement against the cylindrical surface wall and the shaft by the bias of the sliding and adjustment ring thereagainst and the resulting changes in the diametric dimensions of the sealing ring.

Especially efficient is the use of materials for the sealing element which have a higher thermal conductivity than the well-known rubber-type elastic materials. This decreases the thermal stress of the sealing element through an increased heat transfer to the shaft or the protective tube in the sealing element region, with a coating which exhibits at least the thermal conductivity of the basic material.

Moreover, it is advantageous to shape the sealing element in such a way that a chamber is obtained to accommodate foreign matter. The sealing element has to permit a small axial and radial clearance of the axial seal ring in order to compensate elastically for vibrations and compressive impact loads of the machine shaft. These requirements are realized by a good sliding behaviour and elastic reaction of the sealing element.

The sealing element corresponding to the present invention which is made of material with low elasticity and oversizing interior and outside diameter can be installed into the chamber created by the axial seal ring and the shaft without damaging the sealing element due to the elastic behaviour gained by its shape. Thereby an assembling safety as good as with seal rings made of elastomers is obtained. For instance a glass-fibre reinforced PTFE sealing element manufactured with oversize does not result in blocking the rotating axial seal ring, in addition the axial and radial clearance required is maintained, and the seal ring does not open under the influence of vibration and compressive impact loads. The sealing element acts like an elastomer ring. Though made of rigid material, the oversized sealing element does not exhibit any loss of material when the axial seal ring is slipped onto the shaft and the sealing element, because the latter adjusts itself elastically. On the other hand, a PFTE glass-reinforced non-elastic formed sealing element of a conical form, such as described in French Pat. No. 1,131,832 has to be produced with very close manufacturing tolerances in order to ensure sealing. That is extremely difficult in the case of PTFE or reinforced PTFE.

It is advantageous to design the radial contact surfaces of the sealing element in spherical form which results in an adaptation to the surfaces to be sealed on the machine shaft and at the sliding rings.

The sealing element, consisting of two arms connected at one end, seals onto the machine shaft surface like a double O-ring sealing. In this way a highly loaded sealing area is doubly secured. In addition, the two arms provide a space for absorbing dirt.

In contrast with an O-ring, this sealing element at the same time increases the heat transfer owing to the two fold contacting surface on the shaft. On using suitable coatings a further improvement of heat removal can be obtained in the seal face region from the sealing element to the machine shaft or to the protective shaft tube. The coating should be done by use of materials having at least the thermal conductivity of the basic material. Alloy steel with 18% Ni and 10% Cr has a thermal conductivity of 46 W/mK, alumina oxide (99% $Al_2O_3$) 21 W/mK and molybdenum 123 W/mK.

The use of metal oxides or ceramic materials for coating results in decreasing the thermal conductivity of the contact surfaces between sealing element and machine shaft.

However, the use of metallic materials for coating shafts or protective shaft tubes (e.g. molybdenum or chromium-nickel) results in establishing a wear-resistant and non-corrosive layer which decreases the heat accumulation in the area of the sealing element contact surfaces. It is practical to extend the coating area to at least ten times the width of the sealing element in order to guarantee a good heat dissipation on the surface.

Rubber-type elastic materials usually have a bad sliding behaviour on the shaft, in fact a high static friction. In an extreme situation the O-ring will be curled. With a spherical locating surface of a less elastic material, the sealing element will slide on the shaft very well, for example when using PTFE, the axial and radial clearance required will be improved.

The sealing element according to the present invention is produced to the best advantage that both arms which abut to a connecting ring have a rounded shape in the attachment area to the connecting ring. In this way a splitting of the double arm annulus due to a notch effect is avoided. The radial sealing element proposed will preferably be dimensioned in such a way that an utilization for seal rings with a rubber-type elastic radial O-ring is possible. The sealing element is locked into the axial seal ring chamber provided and is fixed by means of a reaction ring. Thereby the manufacture of a specially shaped axial seal ring for the sealing element according to the standarization obtained has a special economic importance. Apart from the production savings gained, the expenditure for storing is decreased both for producer and consumers.

For the production of this radial sealing element certain plastic materials are particularly suitable depending on the chemical stability required with respect to the heat and pressure stress. The predominant material is PTFE filled with glass, graphite or carbon. Other materials, e.g. of ceramic or metallic characteristics, can also be added, provided they possess the chemical stability required. The filling diminishes the flow behaviour of the pure PTFE and simultaneously the heat conductivity of the material, (e.g. PTFE filled with artificial coal or graphite resp.) could be increased threefold to fourfold, i.e. up to about 0.9 W/mK. That means also a fourfold heat conductivity improvement compared with rubber.

The chemical stability of carbon or graphite with regard to strong oxidizing agents is not ensured. In such cases the graphite or carbon content of the PTFE has to be reduced if possible even to zero. Then the sealing element is made of pure PTFE or glass-filled PTFE in order to decrease the flow behaviour. A further possibility is the addition of metallic materials, e.g. chromium-nickel in powdered form, resulting in better thermal conductivity. In any case the elastic behaviour of the double-arm ring is preserved as an essential advantage.

PTFE with a glass content of 5 to 75%, PTFE with a graphite or carbon content of 15 to 30%, and a mixture of PTFE with 15 to 30% glass and 5 to 10% graphite or carbon, are advantageous. In addition, a mixture made up of graphite with a PTFE content of 5 to 30% is suitable. Furthermore it is convenient to produce other mixtures in any proportions as well as to add metal powders to PTFE or to one of the above mentioned mixtures in amounts of 0.5 to 95%

Both arms of the sealing element according to the present invention, are arranged symmetrical or unsymmetrical with respect to the centre line of the cross section. The divergence angles of the arms with regard to the centre line may amount to 0.5° up to 89.5°. It is preferred that the arrangement of the arms is symmetrical, with the thickness of the arms being uniform, i.e., the internal and external sides extend parallel. It is possible to design the arms in the shoulder region at the connecting ring thinner and the free arms thicker whenever necessary because of the low elasticity of the material. This results in a softer double-arm ring resilience. By designing the arms thicker in the shoulder region and tapeing them in the direction of the free ends, the double-arm ring will have less resilience.

The sealing element according to the present invention, may also be used for a seal ring assembly whose axial seal ring is slipped onto a hollow shaft or it is applied for the stationary ring. In both cases it is efficient to arrange the two free arm ends outwards. The manufacture of the radial sealing element, which comprised two arms connected with a ring at each end, is carried out to the best advantage from one piece of a hollow cylinder, provided that non-metallic and non brittle material is used.

The double-arm ring can also be produced from a pure metallic material. In this case, the cross section may take the shape of a widened-out hairpin, possessing drop-shaped thickenings at both ends. Moreover, it can be realized that the double-arm rings made of a metallic material have the same cross section shape as for sealing elements made of nearly pure PTFE or the mixtures mentioned. It is favorable to use thin sheet-metal members and connected at their ends to form a ring by means of an appropriate welding process. In this case the cross section of the radial sealing element has a hollow profile.

BRIEF DESCRIPTION OF THE DRAWING(S)

DESCRIPTION OF THE PREFERRED EMBODIMENT(S)

Figure 1:
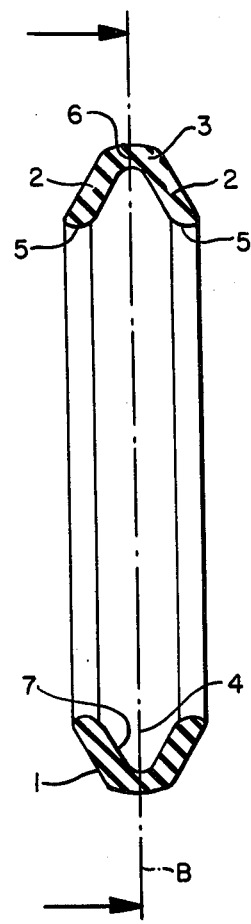
FIG. 1 is a cross-sectional view of the sealing ring.

FIG. 1 illustrates a secondary sealing ring element 1 for axial seal rings according to the invention made of a low-elastic, non-metallic and non-brittle material. The sealing element is rotationally symmetrical with regard to axis A and has a plane of symmetry B. The body consists of two arms (2) connected by a ring (3). Both arms form a freespace (4) and the surfaces of the free arms ends (5) as well as the external ring surface (6) are designed spherically.

Figure 2:
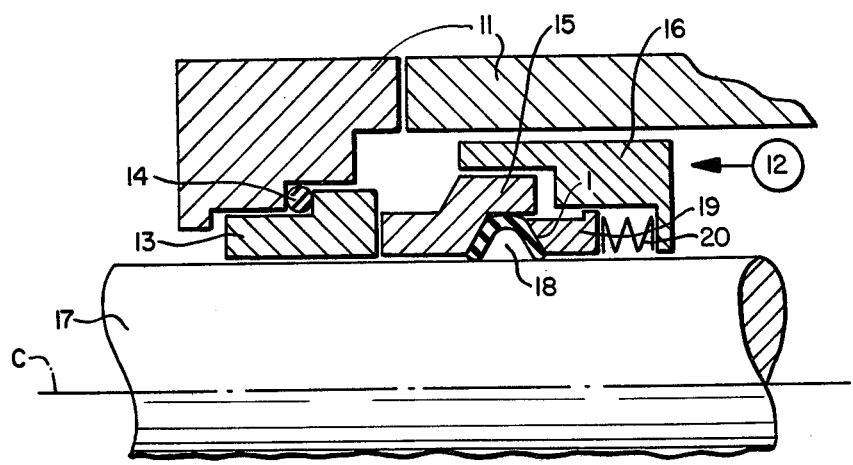
FIG. 2 is a view, partially in cross-section, of the sealing ring as installed for use in a machine.

FIG. 2 shows a sealing element as in FIG. 1 installed into a mechanical seal, which is assembled in a machine casing (11). Assembly of the device takes place from the direction indicated by (12). In the casing, a stationary seal ring (13) with sealing element (14) is inserted. The rotary axial sealing (15) is guided by a casing (16) attached to the shaft (17) with rotational axis C. For accommodating the sealing element according to the present invention a recess (18) is provided in the axial seal ring (15).

An adjustment ring (19) presses with the help of a spring (20) towards the sealing element (1).

Figure 3:
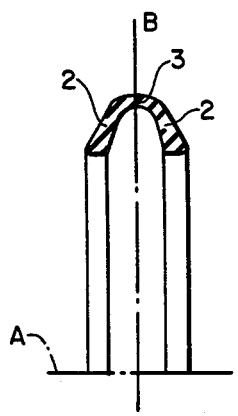
FIG. 3 shows another embodiment of the sealing ring.

The sectional drawing, FIG. 3, shows a version of the sealing element (FIG. 1) with a thickening of the two arms (2) towards their free ends.

Figure 4:
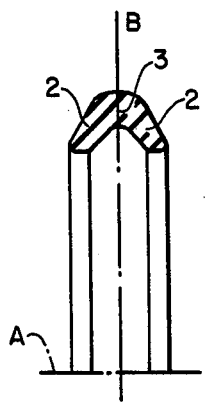
FIG. 4 shows a further embodiment of the sealing ring.

The sectional drawing, FIG. 4, shows a version of the sealing element (FIG. 1) with a tapering of the two arms (2) towards their free ends.

Figure 5:
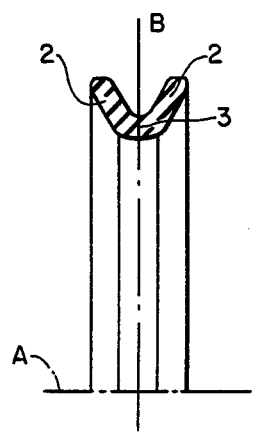
FIG. 5, shows a still further embodiment of the sealing ring.

The sectional drawing of FIG. 5 shows a version of the sealing element according to FIG. 1 where the free arms (2) are directed outwards away from the axis A.

The versions of FIGS. 3, 4, 6, and 7 can also be made with outwardly directed free arms (2) as illustrated in FIG. 5.

Figure 6:
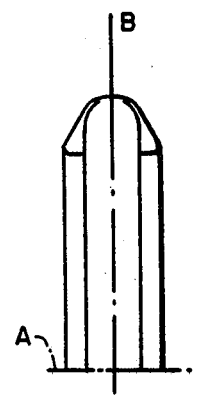
FIGS. 6 and 7 show additional embodiments of the sealing ring.

The sectional drawing of FIG. 6 shows a sealing element version which can be applied when using metallic materials.

Figure 7:
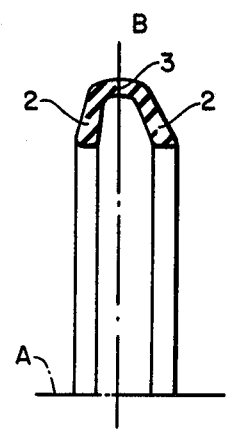

The sectional drawing of FIG. 7 shows a version of the sealing element, in which the arms have different angles to the plane B.

EXAMPLE

A secondary sealing element according to the invention, an embodiment of which is illustrated in FIG. 1, is produced through machining from a hollow PTFE cylinder containing 25% graphite. The graphite content increases the thermal conductivity from 0.23 W/mK (pure PTFE) up to 0.93 W/mK. The interior diameter is manufactured with minus-tolerance and the outer diameter with plus-tolerance. The arms (2) of FIG. 1 and the plane of symmetry B form an angle of 30°. Both arms have a thickeness of 1.7 mm.

When the ring is slipped over the machine shaft both arms are spread out and the interior diameter is adjusted to the shaft diameter. The outer diameter decreases and the lever collar can be slipped over without any difficulty. Only by pressing the adjustment ring (19) shown in FIG. 2 do the external and internal boundary surfaces of the double-arm sealing ring develop their complete sealing configuration and sealing characteristics.

This sealing ring can also be used as a secondary sealing element (14) in order to seal the stationary seal ring (13) shown in FIG. 2. In this, the use of the version of the sealing ring in FIG. 5 is recommended. Then the contact surfaces of the stationary seal ring (13) and the casing (11) (cf. FIG. 2) may have the same angle as the arms of the sealing element.

I claim:

1. A secondary sealing device for an axial seal ring assembly having a chamber therein with a cylindrical surface wall surrounding the axial shaft, the secondary sealing device comprising:
   (a) a biased axial sliding and adjustment ring positioned in the chamber; and
   (b) a sealing ring positioned around the shaft in the chamber between the cylindrical surface wall and sliding and adjustment ring, formed of a material with good sliding, low-elasticity, and non-brittle characteristics, having a generally U-shaped cross-section with two arms extending from a plane perpendicular to the axis of rotation of the shaft, and pressed into sealing engagement against the cylindrical surface wall and the shaft by the axial bias of the sliding and adjustment ring against the side of one of the two arms of the sealing ring and the resulting changes in the diametric dimensions of the sealing ring.

2. A sealing device according to claim 1, wherein the arms have surface ends formed spherically.

3. A sealing device according to claim 1 or 2, wherein a spring acts against the adjustment ring to bias and hold in position the sealing ring.

4. A sealing device according to claim 1 or 2, wherein the arms of the sealing ring form an inner connecting zone of a rounded shape.

5. A sealing device according to claim 1 or 2, wherein the arms are symmetrical to the plane perpendicular to the axis of rotation of the shaft.

6. A sealing device according to claim 1 or 2, wherein both arms have a constant thickness.

7. A sealing element according to claim 1 or 2, wherein both arms have a thickness increasing from the shoulder to the ends of the arms.

8. A sealing element according to claim 1 or 2, wherein both arms have a thickness decreasing from the shoulder to the ends of the arms.

9. A sealing element according to claim 1 or 2, wherein the sealing ring has an interior diameter manufactured with minus-tolerance and an outer diameter with plus-tolerance.

10. A sealing element according to claim 1 or 2, wherein the sealing ring is made of a material selected from the group consisting of PTFE, graphite, carbon, a mixture of PTFE and graphite, or a mixture of PTFE and carbon.

11. A sealing device according to claim 10, wherein the sealing ring is made of a materiaL selected from the group consisting of a mixture of 0.5 to 50 wt. % glass with PTFE, PTFE and graphite, or PTFE and carbon.

12. A sealing device according to claim 10, wherein the sealing ring is made of PTFE, mixed with 20 wt. % glass and 5 wt. % graphite.

13. A sealing device according to claim 10, wherein the sealing ring is made of PTFE mixed with metallic powder.

14. A sealing device according to claim 1 or 2, wherein the sealing ring is made from a hollow cylinder.

15. A sealing device according to claim 1 or 2, wherein the sealing ring is made from thin metallic sheets in the form of a hollow profile.

16. A sealing device according to claim 1 or 2, wherein the sealing ring is made from thin metallic sheets in the form of a hairpin with drop-like thickenings at the arm ends.

17. A sealing device according to claim 1 or 2, wherein the sealing ring has an outer shape congruent to an O-ring chamber formed by the sliding and adjustment ring.

18. A sealing device according to claim 1 or 2, wherein both ends of the arms of the sealing ring sealing engage the shaft and form a hollow therebetween for good sealing, heat dissipation and dirt absorption characteristics.

19. A sealing device according to claim 1 or 2, wherein the arm ends of the sealing ring press against a shaft having a wear and corrosion resistant layer in the surface area of contact between the sealing ring and shaft.

20. A sealing device according to claim 1 or 2, wherein the arms are directed radially outwardly from the shoulder to the ends of the arms.

* * * * *